(12) United States Patent
Beall et al.

(10) Patent No.: US 6,843,822 B2
(45) Date of Patent: *Jan. 18, 2005

(54) FILTER WITH VARYING CELL CHANNELS

(75) Inventors: Douglas M. Beall, Painted Post, NY (US); Johnny Marcher, Helsinge (DK)

(73) Assignee: Corning Incorporated, Corning, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/736,929

(22) Filed: Dec. 15, 2003

(65) Prior Publication Data

US 2004/0128965 A1 Jul. 8, 2004

Related U.S. Application Data

(63) Continuation of application No. 10/202,711, filed on Jul. 24, 2002, now Pat. No. 6,696,132, which is a continuation-in-part of application No. 09/943,258, filed on Aug. 30, 2001, now abandoned.

(51) Int. Cl.[7] .............................................. B01D 46/24
(52) U.S. Cl. ...................... 55/523; 55/385.3; 55/484; 55/DIG. 30; 60/311; 428/116; 502/527.19
(58) Field of Search ................ 55/385.3, 484, 55/523, DIG. 30; 428/116, 117, 188, 698, 34.4; 60/311; 502/527.19

(56) References Cited

U.S. PATENT DOCUMENTS

| 4,233,351 A | | 11/1980 | Okumura et al. | |
|---|---|---|---|---|
| 4,276,071 A | | 6/1981 | Outland | |
| 4,293,357 A | | 10/1981 | Higuchi et al. | |
| 4,329,162 A | | 5/1982 | Pitcher, Jr. | |
| 4,343,604 A | | 8/1982 | Minjolle | |
| 4,362,495 A | | 12/1982 | Naito et al. | |
| 4,364,761 A | * | 12/1982 | Berg et al. | 55/523 |
| 4,416,676 A | * | 11/1983 | Montierth | 55/523 |
| 4,417,908 A | | 11/1983 | Pitcher, Jr. | |
| 4,420,316 A | | 12/1983 | Frost et al. | |
| 4,468,365 A | | 8/1984 | Corbett et al. | |
| 4,521,532 A | | 6/1985 | Cho | |
| 4,643,749 A | * | 2/1987 | Miura | 55/523 |
| 4,810,554 A | * | 3/1989 | Hattori et al. | 55/523 |
| 5,108,685 A | | 4/1992 | Kragle | |
| 5,630,951 A | | 5/1997 | Peters | |
| 5,761,787 A | | 6/1998 | Kragle et al. | |
| 5,914,187 A | | 6/1999 | Naruse et al. | |
| 6,696,132 B2 | * | 2/2004 | Beall et al. | 55/523 |
| 2004/0123573 A1 | * | 7/2004 | Ichikawa et al. | 55/523 |

FOREIGN PATENT DOCUMENTS

| JP | 63-28520 | 2/1988 |
|---|---|---|
| JP | 63-28522 | 2/1988 |
| JP | 63-28523 | 2/1988 |
| JP | 01-304022 | 12/1989 |

* cited by examiner

*Primary Examiner*—Duane Smith
*Assistant Examiner*—Jason M. Greene
(74) *Attorney, Agent, or Firm*—Anca C. Gheorghiu

(57) ABSTRACT

A honeycomb structure which includes an inlet end and an outlet end opposing each other and a plurality of cell channels extending along an axis from the inlet end to the outlet end, the cell channels having non-equal, square cross-sections, and an extrusion die for making the same.

7 Claims, 5 Drawing Sheets

FILTER WITH VARYING CELL CHANNELS

This application is a continuation of application Ser. No. 10/202,711, filed Jul. 24, 2002, now U.S. Pat. No. 6,696,132, which is a continuation-in-part of application Ser. No. 09/943,258 filed Aug. 30, 2001, now abandoned.

BACKGROUND OF THE INVENTION

The present invention relates to a multicellular structure, such as a honeycomb, particularly for trapping and combusting diesel exhaust particulates.

Wall-flow filters are used in the purification of diesel exhaust. Typically such diesel particulate filters are made of cordierite or silicon carbide and include a honeycomb body having thin interconnecting porous walls which form parallel cell channels of equal hydraulic diameter, longitudinally extending between the end faces of the structure. Alternating cells on one end face of the honeycomb are plugged with a ceramic filler material to form a "checkerboard" pattern. The pattern is reversed on the opposite side, so that the ends of each cell are blocked at only one end of the structure. When diesel exhaust enters the filter through one end face (i.e., inlet end), it is forced to pass through the porous walls in order to exit through the opposite end face (i.e., outlet end).

For diesel particulate filtration, honeycomb structures having cellular densities between about 10 and 300 cells/in$^2$ (about 1.5 to 46.5 cells/cm$^2$), more typically between about 100 and 200 cells/in$^2$ (about 15.5 to 31 cells/cm$^2$), are considered useful to provide sufficient thin wall surface area in a compact structure. Wall thickness can vary upwards from the minimum dimension providing structural integrity of about 0.002 in. (about 0.05 mm.), but are generally less than about 0.060 in. (1.5 mm.) to minimize filter volume. A range of between about 0.010 and 0.030 inches (about 0.25 and 0.76 mm.) e.g., 0.019 inches, is most often selected for these materials at the preferred cellular densities.

Interconnected open porosity of the thin walls may vary, but is most generally greater than about 25% of thin wall volume and usually greater than about 35% to allow fluid flow through the thin wall. Diesel filter integrity becomes questionable above about 70% open pore volume; volumes of about 50% are therefore typical. For diesel particulate filtration it is believed that the open porosity may be provided by pores in the channel walls having mean diameters in the range of about 1 to 60 microns, with a preferred range between about 10 and 50 microns.

Filtration efficiencies up to and in excess of 90% of the diesel exhaust particulates (by weight) can be achieved with the described cordierite materials. The filtration of a lesser but still significant portion (i.e. less than 50%) of the particulates may be desirable for other filtering applications including exhaust filtering of smaller diesel engines. Efficiencies, of course, will vary with the range and distribution of the size of the particulates carried within the exhaust stream. Volumetric porosity and mean pore size are typically specified as determined by conventional mercury-intrusion porosimetry.

U.S. Pat. No. 4,420,316 to Frost et al. discusses cordierite wall-flow diesel particulate filter designs. U.S. Pat. No. 5,914,187 discusses silicon carbide wall-flow diesel particulate filters.

There are problems associated with conventional filters of the type described therein. Specifically, as the exhaust passes through the filter, particulate matter (i.e., carbon soot) accumulates on the wall of the cell channels or in the pores of the wall and forms a soot layer. This soot layer decreases the hydraulic diameter of the cell channels contributing to a pressure drop across the length of the filter and a gradual rise in the back pressure of the filter against the engine.

Eventually, the pressure drop becomes unacceptable and regeneration of the filter becomes necessary. In conventional systems, the regeneration process involves heating the filter to initiate combustion of the carbon soot layer. Normally, during regeneration the temperature in the filter rises from about 400–600° C. to a maximum of about 800–1000° C. Under certain circumstances, a so-called "uncontrolled regeneration" can occur when the onset of combustion coincides with, or is immediately followed by, high oxygen content and low flow rates in the exhaust gas (such as engine idling conditions). During an uncontrolled regeneration, the combustion of the soot may produce temperature spikes within the filter which can thermally shock and crack, or even melt, the filter. The highest temperatures during regeneration tend to occur near the exit end of the filter due to the cumulative effects of the wave of soot combustion that progresses from the entrance face to the exit face of the filter as the exhaust flow carries the combustion heat down the filter.

In addition to capturing the carbon soot, the filter also traps "ash" particles that are carried by the exhaust gas. These particles which include metal oxide impurities, additives from the lubrication oils, sulfates and the like, are not combustible and, cannot be removed during regeneration. Furthermore, if temperatures during uncontrolled conditions are sufficiently high, the ash particles may eventually sinter to the filter or even react with the filter resulting in partial melting.

It has been recognized that, since in operation the soot built-up reduces the effective flow area of the cell channels, this collection of particulates forming a cake on the cell wall surfaces and in the pores, ultimately also affects the pressure drop. One approach for addressing this problem has been proposed in U.S. Pat. No. 4,276,017 issued to Outland on Jun. 30, 1981. Outland discloses a filter design having cross-sectional areas of the inlet channels larger than the cross-sectional areas of the adjacent outlet or exhaust channels. To achieve the non-equal area inlet and outlet passages, Outland teaches non-equilateral hexagonal cross-section inlet cell channels adjacent triangular cross-section outlet cell channels, as illustrated in FIGS. 5h–j, and patterns with curving or bulging inlet and/or outlet channels, as illustrated in FIGS. 5k–p. In the design of the filter structure, Outland also requires that all internal walls extend between inlet and outlet channels except at their points of intersection, such as at the corners. However, such designs are not practical and more importantly difficult to manufacture in an efficient and cost-effective manner. Current technology die limits the fabrication of such complex honeycomb structures.

It would be desirable to obtain a diesel exhaust particulate filter that exhibits increased carbonaceous soot and ash particulate storage capacity while at the same time maintaining good gas flow rates. It would also be desirable to manufacture such a filtering device efficiently and cost-effectively with current die technologies.

SUMMARY OF THE INVENTION

The present invention provides diesel particulate filters with increased capacity for storing carbonaceous soot and ash particulate while maintaining good gas flow rates during use. At the same time the inventive structure can be manufactured in an efficient and cost-effective manner with current die technologies.

In addition to the economic advantages, other advantages of the inventive filters include performance advantages. One such advantage is expected to reside in lower pressure drops and consequently lower rates of pressure increase at high soot loadings (i.e., >5 g/L). The pressure drop across a wall-flow filter depends on a number of factors, including the initial or "clean" pressure drop of the structure; the hydraulic diameter of the cell channels; the packing density of the of the soot on the interior walls of the structure; and the extent to which the soot penetrates the porosity of the interior walls, especially during the early stages of soot deposition. As the amount of soot accumulated increases, the hydraulic diameter decreases resulting in a progressive increase in the resistance to flow of the exhaust gas through the walls and the carbon soot layer. This resistance to flow can be measured across the length of the filter, and results in an increased back pressure against the engine.

In the larger inlet cell channels of the inventive filters the same amount of soot will result in a thinner carbon soot layer and less detrimental decrease in the hydraulic diameter. Therefore, the exhaust gas will not only be able to flow easier through the cell channels, but also through the soot layer on the interior walls. Consequently, less regenerations are required.

A related advantage is higher ash storage capacity. Ash, like soot, is deposited on the interior walls of the inlet cells. Again the larger inlet cell surface area can accommodate a higher amount of ash with less frequent cleaning cycles.

A further advantage is less face plugging. Face plugging is a condition which occurs when ash or soot covers or blocks inlet cells, in effect creating plugs in these open cells. Undesirably, this condition destroys the functionality of the filter. Larger inlet channels can reduce or eliminate this problem.

The inventive filters are designed to maintain the high thermal mass associated with thick-wall honeycomb structures concurrently with an increased open-frontal area and large inlet hydraulic diameters available only for structures with thinner interior cell walls. For illustrative purposes, in an inventive structure having a cell density of 200 cells per square inch (cpsi), the thermal mass would equal that of a honeycomb structure of the same cell density and a wall thickness 0.019 mil, while the open frontal area and hydraulic diameter would equal those of a honeycomb structure again having the same cell density but a wall thickness of 0.012 mil. The high thermal mass insures significantly more resistance to melting and thermal cracking under conditions encountered in diesel exhaust systems, while the larger open frontal area at the inlet end and hydraulic diameter at the inlet cell channels maintains lower pressure drops at high soot loadings, as previously discussed.

The inventive diesel particulate filters comprise a honeycomb body having an inlet end and an outlet or exhaust end opposing each other and a plurality of cell channels extending along an axis from the inlet end to the outlet end. The cell channels have hydraulic diameters of non-equal diameter, and alternate across the face of the structure. The hydraulic diameter refers to the effective cross-sectional area of the cell through which exhaust flows. The cell channels have a square cross-section formed by straight interior porous walls, with the inlet cells having a greater cross-section than the outlet cells. In the inventive structures the interior walls comprise a first portion facilitating communication between the inlet and outlet cells, with the remaining or second portion engaging only the inlet cells where not in communication with the outlet cells. Preferably the first interior wall portion is filtration active, meaning that exhaust gas is allowed to easily pass through in exiting the inlet cell channels and entering the outlet cell channels, and carbonaceous soot, ash particulates and the like may be collected and captured therein. The remaining portion of the interior walls is preferably filtration non-active meaning that it is not expected that diesel exhaust gas would pass through it to exit the inlet and enter the outlet cells. This second interior wall portion extends about and is in communication only with the inlet passages. Preferably, the inlet cells have a cross-section about 1.1–2.0 times, preferably 1.3–1.6 times greater than the outlet cells. The inventive arrangement provides the advantages of non-equal inlet and outlet passages, namely increased soot and ash particulates storage capacity, and less face plugging, in a square cross-sectional cell design that can be manufactured in an efficient and cost-effective process with current die design technologies.

The honeycomb structures may be formed of cordierite, silicon carbide or of other similarly porous but thermally durable ceramic material. Although the cell density is not critical in the present invention, it is preferred that the honeycomb structures have a cell channel density of about 100–300 cells/in$^2$ (15.5–46.5 cells/cm$^2$), and more preferably about 200 cells/in$^2$ (15.5–31 cells/cm$^2$) and a wall thickness about 0.01 to 0.25 inches (0.25–0.64 mm).

The invention also relates to an extrusion die for fabricating the inventive honeycomb structures, which can be easily produced with current die technologies. The novel die includes a die body which incorporates an inlet face, a discharge face opposite the inlet face, a plurality of feed-holes extending from the inlet face into the body, and an intersecting array of discharge slots extending into the body from the discharge face to connect with the feed holes at feed hole/slot intersections within the die, the intersecting array of discharge slots being formed by side surfaces of a plurality of pins of two different cross-sectional areas, alternating in size such as to form a checkerboard matrix.

DETAILED DESCRIPTION OF PREFERRED EMBODIMENTS

Figure 1:
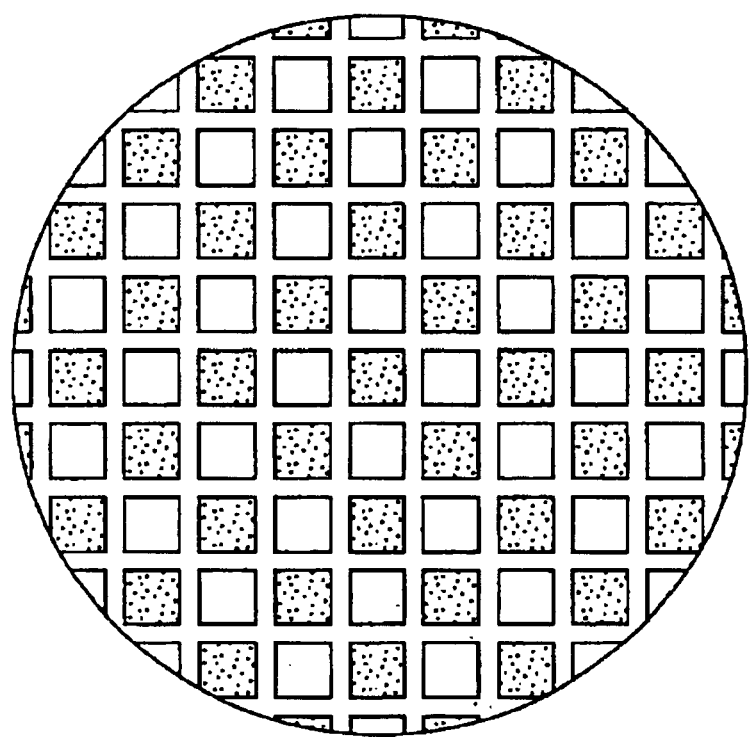
FIG. 1 is an illustration of a prior art end-plugged honeycomb structure with inlet and outlet cell channels of equal diameter.
Figure 2:
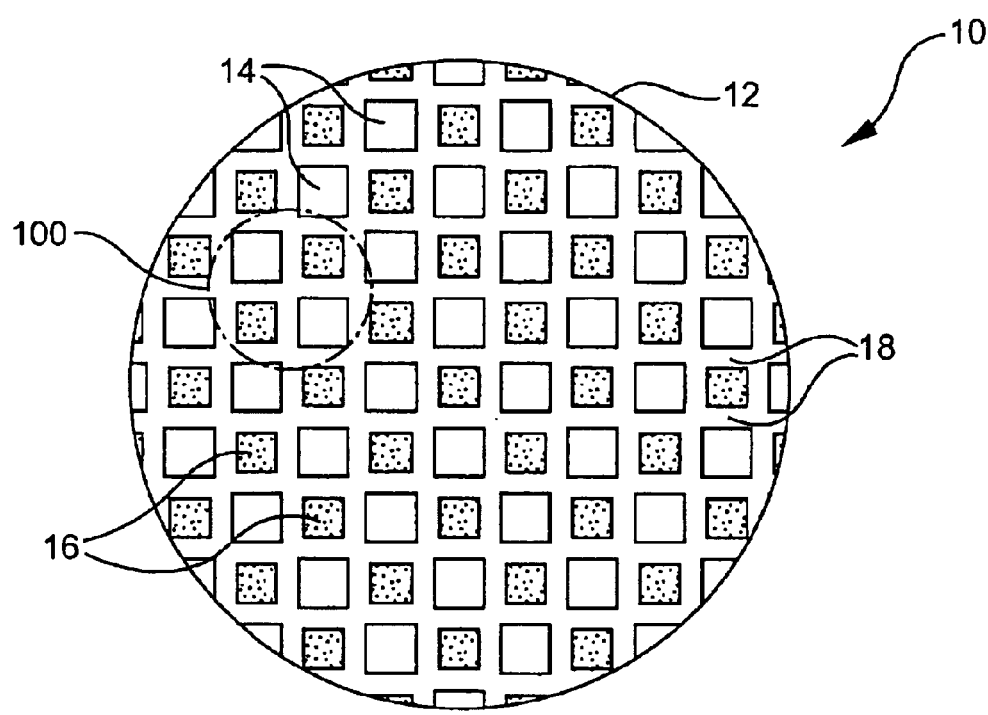
FIG. 2 is an illustration of an embodiment of an end-plugged honeycomb structure according to the present invention with inlet cell channels of larger diameter than outlet cell channels.

Referring to FIG. 1 therein illustrated is a top view of a prior art end-plugged honeycomb structure with cell channels of equal hydraulic diameter. A top view of an embodiment of the present invention is illustrated in FIG. 2. Honeycomb 10 has a front or inlet end 12. Although not shown, the outlet end is opposite the inlet end 12. A plurality of cell channels which are divided into inlet cell channels 14 and outlet cell channels 16 extend between the inlet and outlet ends. The cell channels have a square cross-section formed by interior porous walls 18. Interior walls 18 are straight, running substantially longitudinal and mutually parallel between the inlet and outlet ends of the structure. The cell channels or passages are arranged to alternate between inlet cell channels 14 and outlet cell channels 16, resulting in a pattern of alternating cell channel with small and large hydraulic diameters. Therefore, each inlet cell channel 14 is bordered on all sides by outlet cell channels 16 and vice versa.

Figure 3:
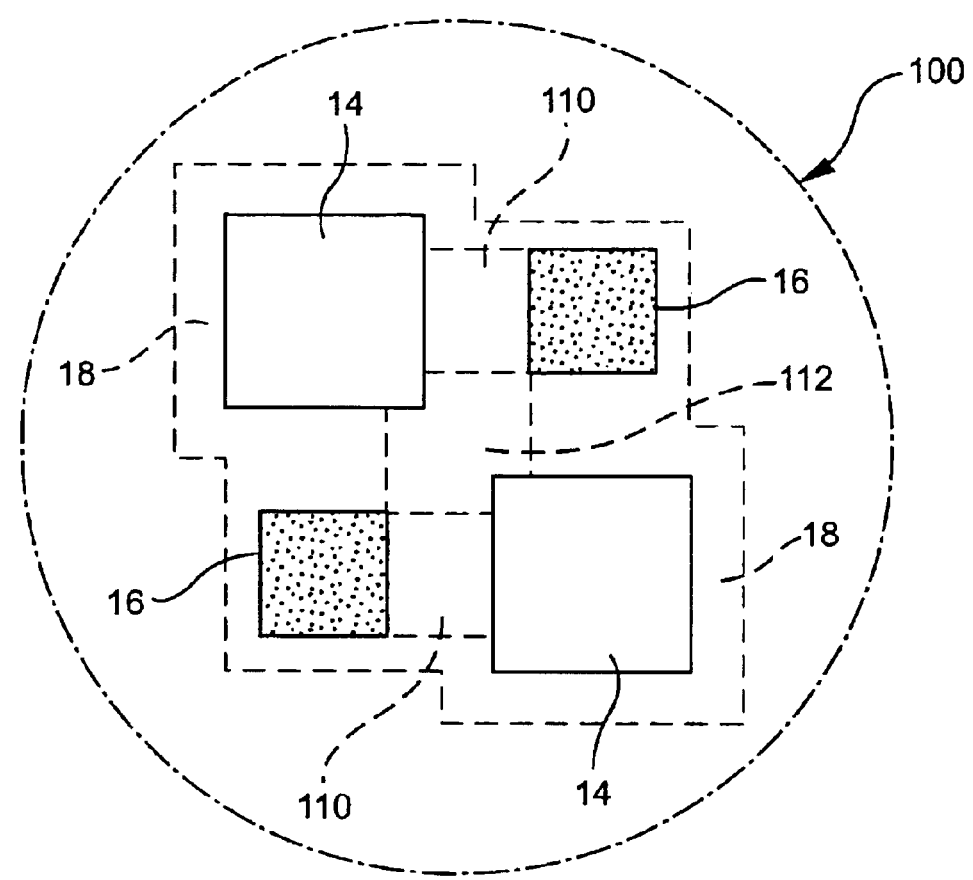
FIG. 3 is an illustration of section 100 of the structure of FIG. 2.
Figure 4A:
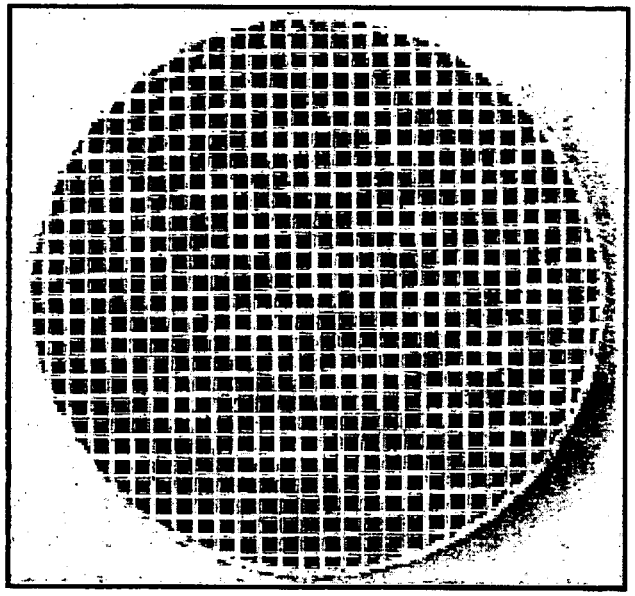
FIGS. 4a–d is a collection of photographs depicting a symmetrical prior art honeycomb structure and wall-flow filter made therefrom (FIGS. 4a, b), together with a honeycomb structure made according to the teachings of the present invention and a wall-flow filter made therefrom (FIGS. 4c, d).
Figure 4B:
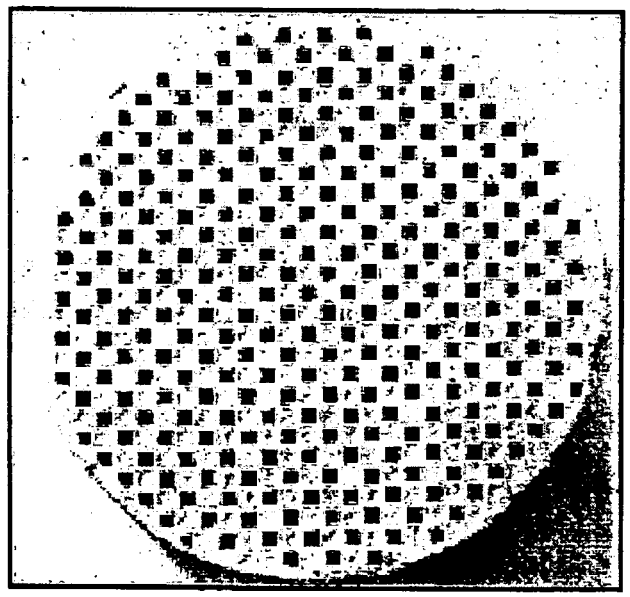
Figure 4C:
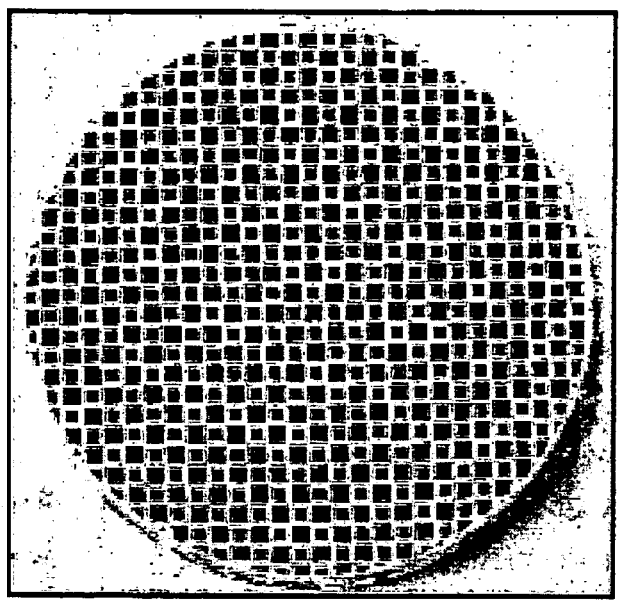
Figure 4D:
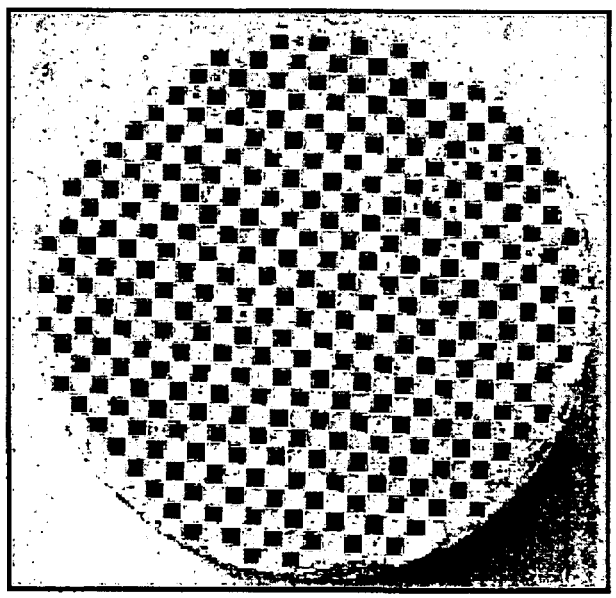

Referring to FIG. 3, therein illustrated is a close-up view of the section 100 of FIG. 2 which better shows the structure of the inventive honeycombs. A first portion of the interior walls 18 is common to both inlet 14 and outlet 16 cells. This portion depicted by the numeral 110 resides between entire length of outlet cells 16, but only between part of inlet cells 14. Portion 110 of interior wall 18 is preferably filtration active, meaning that in operation diesel exhaust flows therethrough from the inlet passages 14 to outlet passages 16. The remaining portion 112 of the interior walls 18 engages the section of inlet passages 14 not in communication with outlet passages 16. Interior wall 112 is preferably filtration non-active, meaning that in operation exhaust gas is less likely to flow therethrough from inlet passages 14 to reach outlet passages 16. It is to be noted, however, that some carbonaceous and ash particulates may be captured and collected therein. The cross-section or hydraulic diameter of inlet cell channels 14 is about 1.1–2.0 times, preferably about 1.3–1.6 times greater than the hydraulic diameter of the outlet cell channels 16. Although not critical, preferably the structures have a cell density of about 100–300 cells/in$^2$ (15.5–46.5 cells/cm$^2$), and more preferably about 200 cells/in$^2$ (15.5–31 cells/cm$^2$), and preferably a wall thickness about 0.001 to 0.025 inches (0.25–0.64 mm), and more preferably about 0.019 inch (0.486 mm).

Both inlet cell channels 14 and outlet cell channels 16 are plugged along a portion of their lengths, either at the inlet end or the outlet end. In FIGS. 2 and 3 since the inlet end is shown, outlet cell channels 16 are plugged. The plugs thickness is preferably about 2 mm to 5 mm in depth. Therefore, inlet cell channels 14 are open at the inlet end and plugged at the outlet end. Conversely, outlet cell channels 16 are plugged at the inlet end and open at the outlet end. This plugging checkerboard configuration allows more intimate contact between the fluid stream and the porous walls of the structure. Fluid stream flows into the honeycomb structure through inlet cell channels, then through the porous cell walls, and out of the structure through the outlet cell channels.

Referring to FIGS. 4a–d, the present invention is better illustrated by a side-by-side comparison of a symmetrical prior art honeycomb and an end-plugged filter made therefrom, together with an inventive honeycomb structure and a resulting end-plugged filter, respectively.

The inventive structures are especially suited as diesel particulate filters, especially in applications where regeneration of the filter by burning of the carbon soot can result in locally high temperatures within the filter, thus necessitating excellent thermal shock resistance. The inventive honeycomb structures may be formed of cordierite, silicon carbide or of other similarly porous but thermally durable ceramic material. The honeycomb structures may be either circular or square in cross-section. However, the filter of course need not have these shapes, but may be oval, rectangular, or any other cross-sectional shape that may be dictated by the particular exhaust system design selected for use.

The invention also relates to an extrusion die for fabricating the inventive honeycomb structures. Honeycomb extrusion dies suitable for the manufacture of honeycomb bodies with alternating channel diameters, as described in the present invention, will have pin arrays comprising pins of alternating size. It is not critical to the present invention how such dies are fabricated and as such could be provided by any one of a number of known methods, including the assembly of arrays of plates as disclosed in U.S. Pat. No. 4,468,365 or by bonding pin arrays to a suitable die base plate as described in U.S. Pat. No. 5,761,787. A preferred method however would be to use a plunge EDM process with an EDM electrode configured to have multiple rows of parallel-aligned tabs of two different cross-sectional areas alternatively arranged.

Therefore, the novel die includes a die body which incorporates an inlet face, a discharge face opposite the inlet face, a plurality of feedholes extending from the inlet face into the body, and an intersecting array of discharge slots extending into the body from the discharge face to connect with the feed holes at feed hole/slot intersections within the die, the intersecting array of discharge slots being formed by side surfaces of a plurality of pins of non-equal cross sectional areas, alternating in size such as to form a checkerboard matrix.

A suitable method for fabricating the inventive structures is by forming a plasticized mixture of powdered raw materials which is then extruded through into a honeycomb body with alternating cell channel diameters, optionally dried and then fired to form the product structure. The fired honeycomb filter is typically mounted by positioning the filter snugly within a cylindrical steel filter enclosure with a refractory resilient mat disposed between the filter sidewall and the wall of the enclosure. The ends of the enclosure may then be provided with inlet and outlet cones for channeling exhaust gas into and through the alternately plugged channels and porous wall of the structure.

In the present invention the plugging process is made easier due to the differences in size of the inlet and outlet cell channels. Typically the plugging process is carried out manually and involves the employment of a flexible mask in one of the filter to cover every other cell channel in a checkerboard pattern. The exposed channels are then filled with a ceramic paste (of a material similar the honeycomb structure) that can be fired to result in a ceramic plug. The pattern is reverse on the opposite end of the structure to plug each cell channel only at one end. A disadvantage of this procedure is that after plugging the first side, it is difficult to determine which holes to insert mask into on the second end. In a preferred embodiment, separate masks are fitted to the front or inlet end and to the back or outlet end to overcome the aforementioned disadvantage. The honeycomb structures may be plugged either before or after firing with a paste having the same or similar composition to that of the green body, using appropriate amounts of a liquid phase to impart a workable viscosity, optionally with the addition of binders and plasticizers, as described in U.S. Pat. No. 4,329,162.

In addition to the embodiments presented herewith, persons skilled in the art can see that numerous modifications and changes may be made to the above invention without departing from the intended spirit and scope thereof.

What is claimed is:

1. A diesel particulate filter comprising a plugged, wall-flow honeycomb filter body composed of inlet and outlet cells formed by interconnecting interior porous walls, the inlet cells having a larger hydraulic diameter than the outlet cells, the inlet cells having four sides which are bordered by outlet cells, wherein only a portion of the interior porous walls is common to both the inlet cells and the adjacent outlet cells.

2. The diesel particulate filter of claim 1 wherein the honeycomb filter body is composed of a ceramic material.

3. The diesel particulate filter of claim 2 wherein the ceramic material is cordierite.

4. The diesel particulate filter of claim 2 wherein the ceramic material is silicon carbide.

5. The diesel particulate filter of claim 1 wherein the first cell channels have a hydraulic diameter 1.1–2 times greater than the second cell channels.

6. The diesel particulate filter of claim 1 wherein the first cell channels have a hydraulic diameter 1.3–1.6 times greater than the second cell channels.

7. The diesel particulate filter of claim 1 wherein the inlet and outlet cells have a square cross-section.

* * * * *